(12) United States Patent  
Jones et al.

(10) Patent No.: US 7,597,268 B2  
(45) Date of Patent: *Oct. 6, 2009

(54) MEMORY MODULE WHICH INCLUDES A FORM FACTOR CONNECTOR

(75) Inventors: Larry Lawson Jones, Palo Alto, CA (US); Sreenath Mambakkam, San Jose, CA (US); Arockiyaswamy Venkidu, Menlo Park, CA (US)

(73) Assignee: MCM Portfolio LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/829,766

(22) Filed: Jul. 27, 2007

(65) Prior Publication Data

US 2008/0017718 A1 Jan. 24, 2008

Related U.S. Application Data

(63) Continuation of application No. 10/063,021, filed on Mar. 12, 2002, now Pat. No. 7,252,240, which is a continuation-in-part of application No. 09/610,904, filed on Jul. 6, 2000, now Pat. No. 6,438,638.

(51) Int. Cl.  
 *G06K 19/06* (2006.01)
(52) U.S. Cl. .................. 235/492; 235/451; 361/737; 439/630
(58) Field of Classification Search ............ 235/492, 235/451, 380, 486; 361/735–737; 439/630, 439/638

See application file for complete search history.

(56) References Cited

U.S. PATENT DOCUMENTS 4,092,732 A 5/1978 Ouchi (Continued)

FOREIGN PATENT DOCUMENTS

DE 20109810 8/2001

(Continued)

OTHER PUBLICATIONS

Actiontec, "CameraConnect Pro Parallel Port Flash Card Reader User's Manual," available at least by Oct. 28, 1999.

(Continued)

*Primary Examiner*—Ahshik Kim  
(74) *Attorney, Agent, or Firm*—Greenberg Traurig, LLP

(57) ABSTRACT

A plurality of flash (solid state) media coupled to a single form factor connector to provide a module, i.e., referred to as a SmartStack module, that can be coupled directly to a device with a SmartStack module controller. The SmartStack module does not include a controller and is controlled from the host side. The form factor connector would typically be a CompactFlash (CF) form factor or some other form factor used in a variety of devices. The SmartStack memory module in a preferred embodiment includes a write protect switch that prevents certain portions of the memory within the SmartStack module from being written to. In addition, a portion of the flash memory will be allocated to the secure area for storing information to implement various forms of security. Another portion of the flash memory is allocated to store optional biometric information such as a user's fingerprint or retinal scan information, etc. In a preferred embodiment, the SmartStack module is a flash memory card in a CF Type I or II format; however, the card will not be compatible with standard CF readers, but will be compatible with SmartStack readers. Larger memory sizes will be available as larger flash memory chips become available.

17 Claims, 5 Drawing Sheets

U.S. PATENT DOCUMENTS

| | | |
|---|---|---|
| 5,296,692 A | 3/1994 | Shino |
| 5,394,206 A | 2/1995 | Cocca |
| 5,396,617 A | 3/1995 | Villwock et al. |
| 5,436,621 A | 7/1995 | Macko et al. |
| 5,437,020 A | 7/1995 | Wells et al. |
| 5,471,038 A | 11/1995 | Eisele et al. |
| 5,485,606 A | 1/1996 | Midgdey |
| 5,497,464 A | 3/1996 | Yeh |
| 5,522,049 A | 5/1996 | Kimura et al. |
| 5,538,436 A | 7/1996 | Garney |
| 5,576,698 A | 11/1996 | Card et al. |
| 5,584,043 A | 12/1996 | Burkart |
| 5,589,719 A | 12/1996 | Fiset |
| 5,596,562 A | 1/1997 | Chen |
| 5,604,917 A | 2/1997 | Saito et al. |
| 5,630,174 A | 5/1997 | Stone et al. |
| 5,640,541 A | 6/1997 | Bartram et al. |
| 5,679,007 A | 10/1997 | Potdevin et al. |
| 5,708,799 A | 1/1998 | Gafken et al. |
| 5,717,951 A | 2/1998 | Yabumoto |
| 5,729,204 A | 3/1998 | Fackler et al. |
| 5,734,894 A | 3/1998 | Adamson et al. |
| 5,740,349 A | 4/1998 | Hasbun et al. |
| 5,752,857 A | 5/1998 | Knights |
| 5,786,769 A | 7/1998 | Coteus et al. |
| 5,790,878 A | 8/1998 | Anderson et al. |
| 5,799,200 A | 8/1998 | Brant et al. |
| 5,802,553 A | 9/1998 | Robinson et al. |
| 5,805,834 A | 9/1998 | McKinley et al. |
| 5,815,426 A | 9/1998 | Jigour et al. |
| 5,828,905 A | 10/1998 | Rao |
| 5,839,108 A | 11/1998 | Daberko |
| 5,844,910 A | 12/1998 | Niijima et al. |
| 5,844,911 A | 12/1998 | Schadegg et al. |
| 5,877,975 A | 3/1999 | Jigour et al. |
| 5,887,145 A | 3/1999 | Harari et al. |
| 5,892,213 A | 4/1999 | Ito |
| 5,905,888 A | 5/1999 | Jones et al. |
| 5,928,347 A | 7/1999 | Jones |
| 5,928,370 A | 7/1999 | Asnaashari |
| 5,929,416 A | 7/1999 | Dos Santos Pato et al. |
| 5,930,496 A | 7/1999 | MacLaren et al. |
| 5,933,328 A | 8/1999 | Wallace et al. |
| 5,956,473 A | 9/1999 | Ma et al. |
| 5,961,652 A | 10/1999 | Thompson |
| 5,964,885 A | 10/1999 | Little et al. |
| 5,974,426 A | 10/1999 | Lee et al. |
| D416,541 S | 11/1999 | Hirai et al. |
| 5,995,376 A | 11/1999 | Schultz et al. |
| 6,002,605 A | 12/1999 | Iwasaki et al. |
| 6,006,295 A | 12/1999 | Jones et al. |
| 6,009,492 A | 12/1999 | Matsuoka |
| 6,010,066 A | 1/2000 | Itou et al. |
| 6,011,741 A | 1/2000 | Wallace et al. |
| 6,015,093 A | 1/2000 | Barrett et al. |
| 6,026,007 A | 2/2000 | Jigour et al. |
| 6,038,400 A | 3/2000 | Bell et al. |
| 6,061,746 A | 5/2000 | Stanley et al. |
| 6,062,887 A | 5/2000 | Schuster et al. |
| 6,067,234 A | 5/2000 | Kim et al. |
| 6,075,706 A | 6/2000 | Learmonth et al. |
| 6,079,621 A | 6/2000 | Vardanyan et al. |
| 6,088,755 A | 7/2000 | Kobayashi et al. |
| 6,088,802 A | 7/2000 | Bialick et al. |
| 6,097,605 A | 8/2000 | Klatt et al. |
| 6,102,715 A | 8/2000 | Centofante |
| 6,112,014 A | 8/2000 | Kane |
| 6,132,223 A | 10/2000 | Seeley et al. |
| 6,137,710 A | 10/2000 | Iwasaki et al. |
| 6,145,046 A | 11/2000 | Jones |
| 6,170,029 B1 | 1/2001 | Kelley et al. |
| 6,170,066 B1 | 1/2001 | See |
| 6,173,291 B1 | 1/2001 | Jenevein |
| 6,175,517 B1 | 1/2001 | Jigour et al. |
| 6,182,162 B1 | 1/2001 | Estakhri et al. |
| 6,189,055 B1 | 2/2001 | Eisele et al. |
| 6,199,122 B1 | 3/2001 | Kobayashi |
| 6,202,932 B1 | 3/2001 | Rapeli |
| 6,203,378 B1 | 3/2001 | Shobara et al. |
| 6,226,202 B1 | 5/2001 | Kikuchi |
| 6,234,844 B1 | 5/2001 | Somerville et al. |
| 6,264,506 B1 | 7/2001 | Yasufuku et al. |
| 6,266,724 B1 | 7/2001 | Harari et al. |
| 6,279,061 B1 | 8/2001 | Aoki et al. |
| 6,279,069 B1 | 8/2001 | Robinson et al. |
| 6,282,612 B1 | 8/2001 | Sakajiri et al. |
| 6,292,863 B1 | 9/2001 | Terasaki et al. |
| 6,317,352 B1 | 11/2001 | Halbert et al. |
| 6,330,688 B1 | 12/2001 | Brown |
| 6,353,870 B1 | 3/2002 | Mills et al. |
| 6,378,015 B1 | 4/2002 | Yen |
| 6,381,662 B1 | 4/2002 | Harari et al. |
| 6,385,677 B1 | 5/2002 | Yao |
| 6,386,920 B1 | 5/2002 | Sun |
| 6,393,524 B1 | 5/2002 | Ayers |
| 6,402,558 B1 | 6/2002 | Hung-Ju et al. |
| 6,405,323 B1 | 6/2002 | Lin et al. |
| 6,408,352 B1 | 6/2002 | Hosaka et al. |
| 6,413,108 B2 | 7/2002 | Centofante |
| 6,426,801 B1 | 7/2002 | Reed |
| 6,438,638 B1 | 8/2002 | Jones et al. |
| 6,468,101 B2 | 10/2002 | Suzuki |
| 6,470,284 B1 * | 10/2002 | Oh et al. ....................... 702/64 |
| 6,482,029 B2 | 11/2002 | Nishimura |
| 6,490,163 B1 | 12/2002 | Pua et al. |
| 6,578,125 B2 | 6/2003 | Toba |
| 6,581,830 B1 | 6/2003 | Jelinek et al. |
| 6,595,803 B2 | 7/2003 | Akagi et al. |
| 6,599,147 B1 | 7/2003 | Mills et al. |
| 6,601,124 B1 | 7/2003 | Blair |
| 6,607,405 B2 | 8/2003 | Nishimura |
| 6,658,202 B1 | 12/2003 | Battaglia et al. |
| 6,658,516 B2 | 12/2003 | Yao |
| 6,663,007 B1 | 12/2003 | Sun |
| 6,666,724 B1 | 12/2003 | Lwee |
| 6,675,233 B1 | 1/2004 | Du et al. |
| 6,684,283 B1 | 1/2004 | Harris et al. |
| 6,705,529 B1 | 3/2004 | Kettunen et al. |
| 6,718,274 B2 | 4/2004 | Huang et al. |
| 6,738,259 B2 | 5/2004 | Le et al. |
| 6,745,267 B2 | 6/2004 | Chen et al. |
| 6,746,280 B1 | 6/2004 | Lu et al. |
| 6,751,694 B2 | 6/2004 | Liu et al. |
| 6,761,313 B2 | 7/2004 | Hsieh et al. |
| 6,761,320 B1 | 7/2004 | Chen |
| 6,808,424 B2 | 10/2004 | Kaneshiro et al. |
| 6,832,281 B2 | 12/2004 | Jones et al. |
| 6,839,864 B2 | 1/2005 | Mambakkam et al. |
| 6,859,369 B2 | 2/2005 | Mambakkam et al. |
| 6,973,535 B2 | 12/2005 | Bruner et al. |
| 7,062,584 B1 | 6/2006 | Worrell et al. |
| 7,065,591 B2 | 6/2006 | Han et al. |
| 7,093,161 B1 | 8/2006 | Mambakkam et al. |
| 7,095,618 B1 | 8/2006 | Mambakkam et al. |
| 7,162,547 B2 | 1/2007 | Hosaka et al. |
| 7,162,549 B2 | 1/2007 | Mambakkam et al. |
| 7,191,270 B2 | 3/2007 | Oh et al. |
| 7,222,205 B2 | 5/2007 | Jones et al. |
| 7,252,240 B1 | 8/2007 | Jones et al. |
| 7,278,051 B2 | 10/2007 | Mambakkam et al. |
| 7,295,443 B2 | 11/2007 | Mambakkam et al. |
| 2001/0039603 A1 | 11/2001 | Manowitz |
| 2002/0069363 A1 | 6/2002 | Winburn |
| 2002/0178307 A1 | 11/2002 | Pua et al. |

| | | |
|---|---|---|
| 2002/0185533 A1 | 12/2002 | Shieh et al. |
| 2003/0038177 A1 | 2/2003 | Morrow |
| 2003/0070112 A1 | 4/2003 | York |
| 2003/0074529 A1* | 4/2003 | Crohas .................. 711/115 |
| 2003/0082961 A1* | 5/2003 | Mowery et al. ............ 439/894 |
| 2003/0084220 A1 | 5/2003 | Jones et al. |
| 2003/0095386 A1* | 5/2003 | Le et al. .................. 361/737 |
| 2003/0172263 A1* | 9/2003 | Liu .......................... 713/156 |
| 2004/0027879 A1 | 2/2004 | Chang |
| 2006/0059385 A1 | 3/2006 | Atri et al. |
| 2006/0242460 A1 | 10/2006 | Mambakkam et al. |
| 2006/0253636 A1 | 11/2006 | Jones et al. |
| 2007/0180177 A1 | 8/2007 | Jones et al. |
| 2007/0283069 A1 | 12/2007 | Jones et al. |
| 2007/0288677 A1 | 12/2007 | Mambakkam et al. |
| 2008/0009196 A1 | 1/2008 | Mambakkam et al. |
| 2008/0250174 A1 | 10/2008 | Jones et al. |
| 2008/0299809 A1 | 12/2008 | Mambakkam et al. |
| 2009/0100207 A1 | 4/2009 | Jones et al. |

FOREIGN PATENT DOCUMENTS

| | | |
|---|---|---|
| EP | 0775964 | 9/1996 |
| EP | 0987876 | 8/1997 |
| EP | 1043884 | 10/2000 |
| EP | 1139208 | 10/2001 |
| JP | 6195524 | 7/1994 |
| JP | 08235028 | 9/1996 |
| JP | 10154211 | 6/1998 |
| JP | 1115928 | 1/1999 |
| JP | 11053485 | 2/1999 |
| JP | 2000286564 | 10/2000 |
| JP | 2002157056 | 5/2002 |
| TW | 490889 | 6/2002 |
| WO | 0023936 | 4/2000 |
| WO | 2004027617 | 4/2004 |

OTHER PUBLICATIONS

Actiontec, "CameraConnect Pro," available at least by Oct. 28, 1999.
Antec, Inc., "PhotoChute3 USB," product manual, pp. 1-18, available at least by Apr. 26, 1999.
Burge, Legand L., et al., "A Ubiquitous Stable Storage for Mobile Computing Devices," ACM, Proceedings of the 2001 ACM Symposium on Applied Computing, pp. 401-404, Mar. 2001.
CompactFlash Association, "CF+ and Compact Flash Specification," Rev. 1.4, Jul 1999.
CQ Publishing of Japan, "Interface," pp. 52-131, Dec. 1, 1999 (article and English translation).
DataFab Systems, Inc., "DataFab Systems Inc., Leading in Portable Storage Systems, Is Now Offering Dual-Slot CompactFlash and SmartMedia Card Reader," Sep. 10, 1999.
DataRescue sa/nv, Inc., "PhotoRescue User's Guide," rev. 1.0, pp. 1-8, 2001.
DataRescue sa/nv, Inc., DataRescue Home Page, located at http://web.archive.org/web/20010722191109/http://datarescue.com, archived Jul. 22, 2001.
DataRescue sa/nv, Inc., DataRescue PhotoRescue™ Specifications, located at http://web.archive.org/web/20010827073251/www.datarescue.com/photorescue/spec.htm, archived Aug. 27, 2001.
Galbraith, Rob, "Building the Ultimate Photo Recovery Kit," located at http://www.robgalbraith.com/bins/content_page.asp?cid=7-4419-4501, Jan. 23, 2002.
Jones, Larry Lawson et al., U.S. Appl. No. 11/003,185 entitled "Flashtoaster for Reading Several Types of Flash Memory Cards with or without a PC," filed Dec. 2, 2004.
Microtech International, Inc., "Microtech Delivers Industry's First 3 Slot SCSI Digital Film Reader," Jan. 5, 2000.
Microtech International, Inc., "Microtech Digital Photography Solutions," available at least by Feb. 26, 2000.
Microtech International, Inc., "Microtech PCD-47B SCSI Digital Film Reader/Writer," available at least by May 24, 2000.
Microtech International, Inc., "Microtech USB CameraMate Supports IBM Microdrive," Feb. 18, 1999.
Microtech International, Inc., "PCD-47 User's Manual," Version 1.1, available at least by May 24, 2000.
Ontrack Data International, Inc., "EasyRecovery™ Professional Edition User Guide," pp. 1-45, 2000.
Steve's Digicams, "CardMate PCF-100 User Review," Apr. 12, 1999.
Steve's Digicams, "Microtech USB CameraMate User Review," Sep. 5, 1999.
Supplementary Search Report for EP Application No. 01952974.2, Sep. 21, 2004.
Twice.com, "Digital Imaging Well Exposed at RetailVision," available at least by Apr. 26, 1999.
Lexmark International, Inc., Service Manual for 5000 and 5700 Color Jetprinter & 5770 Photo Jetprinter, Oct. 2000.
Lexar Media Web Pages—Parallel Port, Universal Readers, FAQ, Jumpshot, Jun. 5, 2000.
Microtouch Smart Media to PCMCIA Adapter Product Sheet, Jun. 8, 2000.

* cited by examiner

| Media Type | CE1 | CE2 | A3 | A5 | A6 | CD1 | CD2 |
|---|---|---|---|---|---|---|---|
| CompactFlash | 1 | 1 | 1 | 1 | 1 | 0 | 0 |
| Memory Stick | 1 | 0 | 1 | 1 | 1 | 0 | 0 |
| MMC/ SD Card | 0 | 1 | 1 | 1 | 1 | 0 | X |
| SmartStack NAND | 0 | 0 | 0 | 0 | 0 | 0 | 0 |
| SmartStack NOR | 0 | 0 | 1 | 0 | 0 | 0 | 0 |
| Reserved | 0 | 0 | 0 | 1 | 0 | 0 | 0 |
| Reserved | 0 | 0 | 1 | 1 | 0 | 0 | 0 |
| Reserved | 0 | 0 | 0 | 0 | 1 | 0 | 0 |
| Reserved | 0 | 0 | 1 | 0 | 1 | 0 | 0 |
| Reserved | 0 | 0 | 0 | 1 | 1 | 0 | 0 |
| Smart Media | 0 | 0 | 1 | 1 | 1 | 0 | 0 |

*FIG. 3*

| S[3:0] | Flash Chip |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| A | 11 |
| B | 12 |

*FIG. 4*

| Pin | CompactFlash Signal | SmartStack Signal |
|---|---|---|
| 14 | A6 | S0 |
| 7 | -CE1 | S1 |
| 32 | -CE2 | S2 |
| 20 | A0 | S3 |

| Byte 0 | Byte 1 | Byte 2 | Byte 3 | Description |
|---|---|---|---|---|
| C3 | B6 | 00 | Xx | Reserved |
| C3 | B6 | 01 | AAH | Secure area starts here. If Byte 3 is AA, this is the last block, else it is 00 to denote a continuation in the next block. |
| C3 | B6 | 02 | AAH | Secure area ends here. |
| C3 | B6 | 03 | AAH | Biometric area starts here. If Byte 3 is AA, this is the last block, else it is 00. |
| C3 | B6 | 04 | AAH | Biometric area ends here. |
| C3 | B6 | 05-54H | Xx | Reserved |
| C3 | B6 | 55H | Xx | Start of Firmware block, fw is < 16K. If Byte 3 is 00, then there are more blocks to follow. |
| C3 | B6 | 55H-A9H | Xx | Reserved |
| C3 | B6 | AAH | AAH | End of Firmware block. Byte 3 is AA to denote end block. |
| C3 | B6 | ABH-FEH | Xx | Reserved |
| C3 | B6 | FFH | FF | Blank Block |

*FIG. 6*

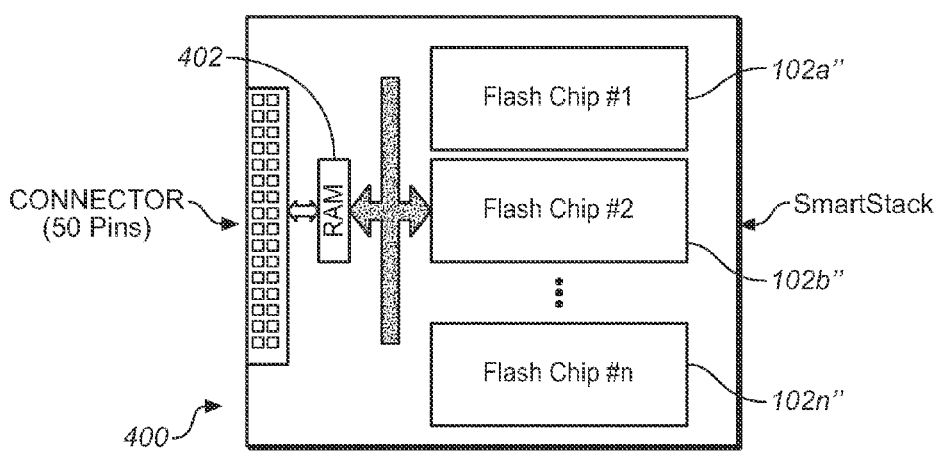

*FIG. 7*

MEMORY MODULE WHICH INCLUDES A FORM FACTOR CONNECTOR

CROSS REFERENCE TO RELATED APPLICATIONS

The present application is a continuation of U.S. patent application Ser. No. 10/063,021 filed Mar. 12, 2002, now U.S. Pat. No. 7,252,240, which is a continuation-in-part of U.S. patent application Ser. No. 09/610,904 filed Jul. 6, 2000, now U.S. Pat. No. 6,438,638, the disclosures of which are incorporated herein by reference.

FIELD OF THE INVENTION

The present invention relates generally to memory modules and more particularly to a memory module which is coupled via a single connector.

BACKGROUND OF THE INVENTION

It is known that flash media is utilized in a variety of environments. Heretofore, the flash media is provided as a separate media to a device. In so doing, an array of different types of modules must be provided to allow for a connection to a device such as a digital camera, MP3 player or flash reader. It is desirable to provide a memory module that could be utilized with a variety of devices. The memory module must be compatible with existing standards and be capable of operating as a module.

Accordingly, what is needed is a system and method for providing a plurality of memories to such a device without requiring multiple connectors or a controller within the memory module. The system should be cost effective, a simple modification and easily implementable into an existing device. The present invention addresses such a need.

SUMMARY OF THE INVENTION

A plurality of flash media are coupled to a single form factor connector to provide a module, i.e., referred to as a SmartStack module, that can be coupled directly to a SmartStack enabled device. The SmartStack module does not include a controller and is controlled from the host side. The form factor connector would typically be a CompactFlash (CF) form factor or other form factors that are used in a variety of devices. The SmartStack memory module in a preferred embodiment includes a write protect switch that will allow for certain portions of the memory within the SmartStack module not to be written to. In addition, a portion of the flash memory will be allocated to the secure area for storing information to implement various forms of security. Another portion of the flash memory is allocated to store optional biometric information such as a user's fingerprint or retinal scan information, etc.

In a preferred embodiment, the SmartStack module is a flash memory card in a CF Type I or II format. The card will not be compatible with CF readers, but will be compatible with SmartStack readers. Larger memory sizes will be available as larger flash memory chips become available. Finally, the SmartStack module will include a write protect switch.

BRIEF DESCRIPTION OF THE DRAWINGS

FIG. 3 is a table which illustrates how a particular card will be detected by a device.

FIG. 4 is a table that illustrates addressing of the SmartStack module.

FIG. 6 illustrates the SmartStack module which includes the write protect, security area and biometric area.

FIG. 7 illustrates adding RAM to SmartStack module to improve performance.

DETAILED DESCRIPTION

The present invention relates generally to memory modules and more particularly to a memory module which is coupled via a single connector. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A plurality of flash media are coupled to a single form factor connector to provide a module, i.e., referred to as a SmartStack module, that can be coupled directly to the device. The SmartStack module does not include a controller and is controlled from the host side. The form factor connector would typically be a CompactFlash (CF) form factor or some other form factor that are used in a variety of devices. The SmartStack memory module in a preferred embodiment includes a write protect switch that will allow for certain portions of the memory within the SmartStack module not to be written to. In addition, a portion of the flash memory will be allocated to the secure area for storing information to implement various forms of security. Another portion of the flash memory is allocated to store optional biometric information such as a user's fingerprint or retinal scan information, etc.

Figure 1:
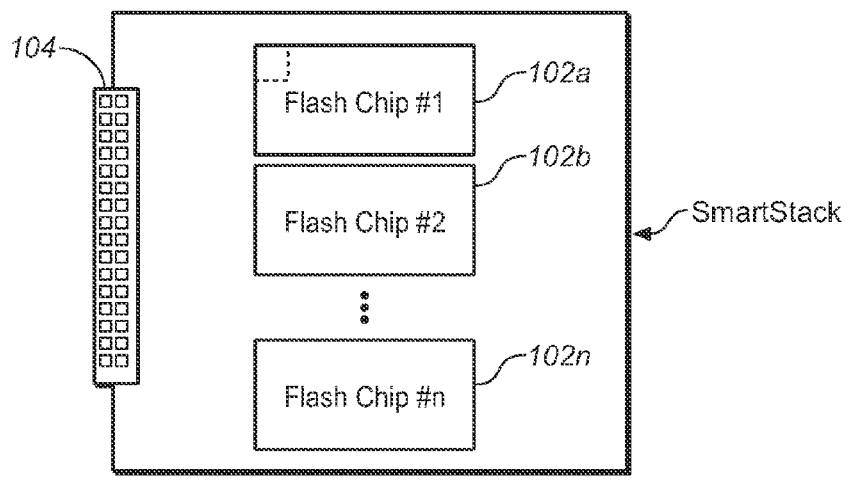
FIG. 1 illustrates a SmartStack module.

To more fully describe the present invention, refer now to the following description in conjunction with accompanying figures. FIG. 1 illustrates a SmartStack module 100. The SmartStack module 100 comprises a plurality of memory devices (i.e., flash chips 102a, 102b through 102n) coupled to a connector 104. In a preferred embodiment, the flash chips are coupled together such that there is redundancy for each section.

Figure 2:
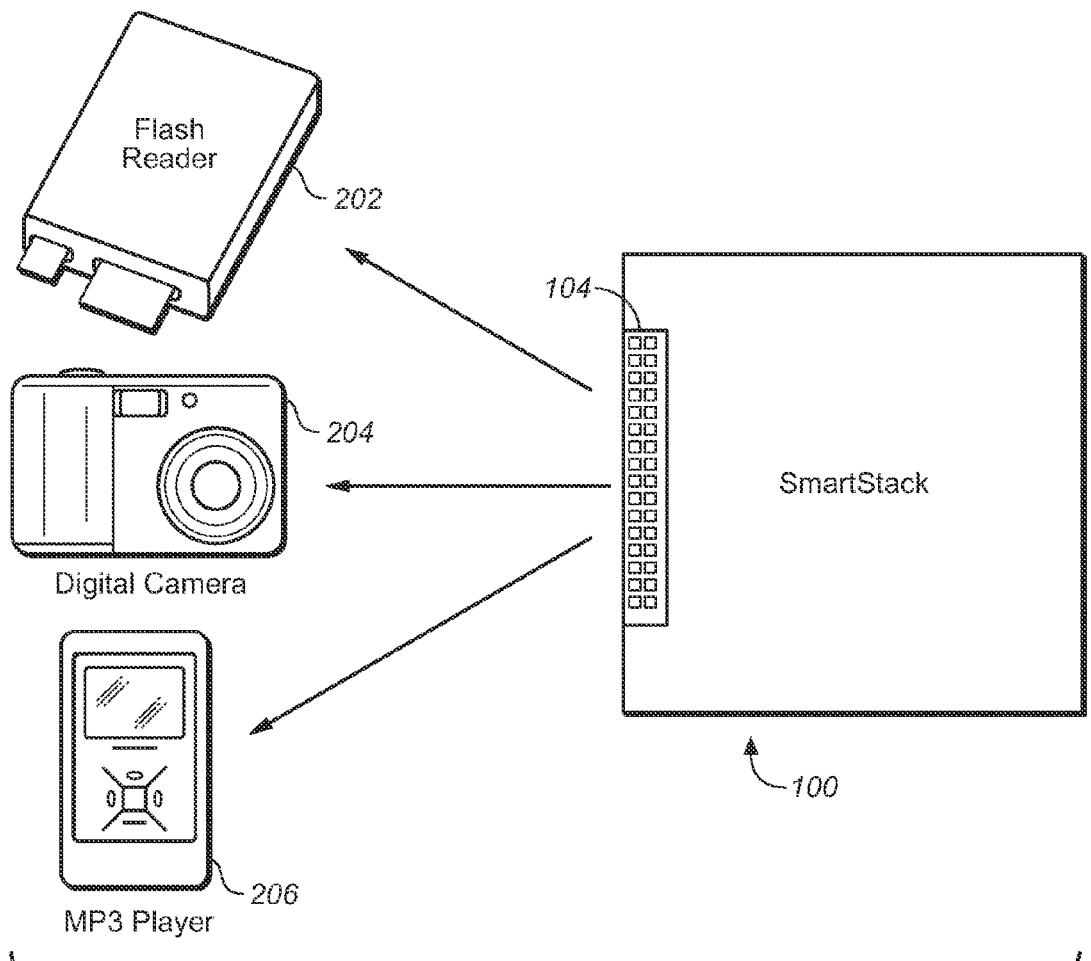
FIG. 2 illustrates examples of the kinds of applications that can utilize SmartStack modules, such as a flash reader, digital camera or MP3 player.

In a preferred embodiment the SmartStack module would have the same form factor as a CompactFlash (CF) card. The module could then be plugged into any CF slot. FIG. 2 illustrates examples of the kinds of applications that can utilize the SmartStack module 100, such as a flash reader 202, digital camera 204 or MP3 player 206. In a preferred embodiment, only SmartStack module 202 based CF readers can read/write to SmartStack media, and inserting a SmartStack module into standard CF readers will not damage the SmartStack. As is seen, the SmartStack module does not include a controller and is controlled from the host side. Since the module itself is devoid of any controller it can be expanded easily to add additional memory.

Card Detection

FIG. 3 is a table which illustrates how a particular card will be detected by a device. In this embodiment, when the SmartStack module (i.e., SmartStack NAND or SmartStack NOR) is plugged into the slot, the card detect pins (CD1 and CD2) will be low. For compatibility with a device that can read a SmartStack module card, the card enable pins (CE1 and CE2) will also be low. As is also seen, the other memory modules will have a different pin configuration for detection.

Addressing

FIG. 4 is a table which illustrates addressing of the SmartStack module. In a preferred embodiment, the SmartStack module will be programmed in a manner that is similar to a conventional memory module. The only difference will be the chip selects.

Figures 4A, 5:
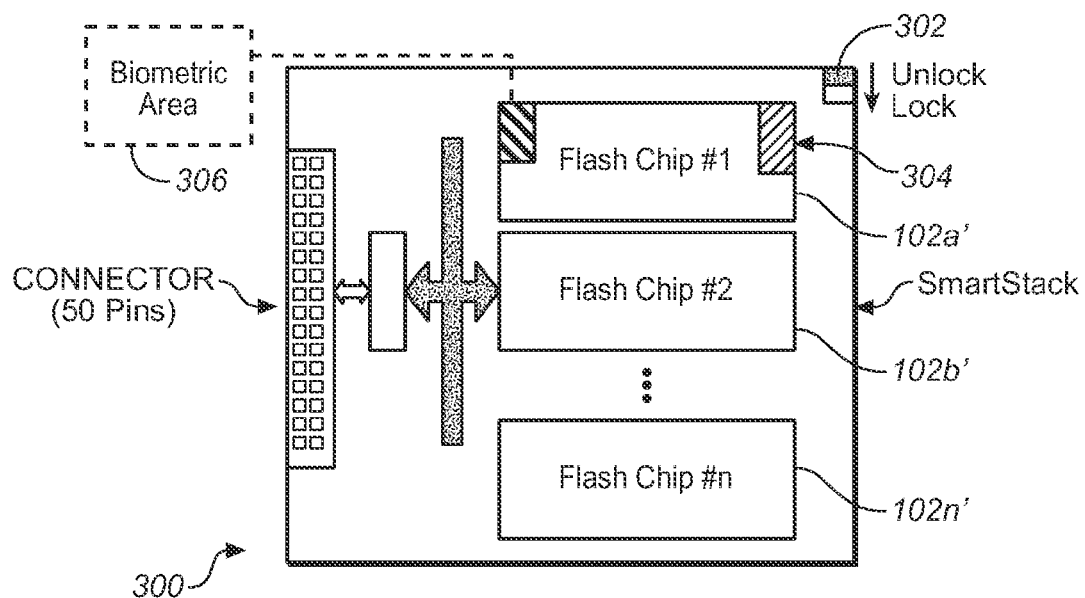
FIG. 4A is a table that illustrates the relationship between the SmartStack module address lines and their equivalent pins on a CompactFlash card.
FIG. 5 is a table which illustrates the setting of a secure area of data for the SmartStack module.

FIG. 4A illustrates the relationship between the SmartStack module address lines (S0 . . . S3) and their equivalent pins in a CompactFlash card.

Security and Biometric Information

FIG. 5 illustrates a SmartStack module 300 which includes the write protect mechanism 302, security area 304 and biometric area 306. The write protect mechanism can be locked or unlocked to allow for writing to the module. The write protect mechanism in a preferred embodiment may be read by software to prevent writing in the user area. It may be necessary to allocate space for security and biometric on each of the individual flash media, in which case the same table will be used to create this information. As is seen in this embodiment, the biometric area 304 and secure area 306 are allocated on 102a'. One of ordinary skill in the art recognizes that the areas 302 and 304 could be located in any or all of the flash chips 102a'-102n' and that would be within the spirit and scope of the present invention.

FIG. 6 is a table which illustrates the setting of a secure area of data for the SmartStack module. For providing a secure area in the SmartStack module, in a preferred embodiment the following method will be followed: the first two bytes, byte 0 and byte 1, will be set to C3 B6. The next byte, byte 2, defines the function. In addition, byte 5 (block status flag) will always be set to 0xF0 (or 0x0F) to indicate a failed block so that an operating system or firmware will not write over it accidentally.

An additional improvement for performance would be to add random access memory (RAM) to the stack. FIG. 7 illustrates adding a RAM 402 to SmartStack module 400 to improve performance. By adding the RAM 402 to the module 400, data can be cached thereto thereby allowing for faster access to data in the module.

Additionally the SmartStack module can be designed to function like daughter boards on a base board so the capacity can be modularly increased. The SmartStack module can also be designed such that you can plug one card at the end of the previous one to form a chain (or daisy chain).

Figure 8:
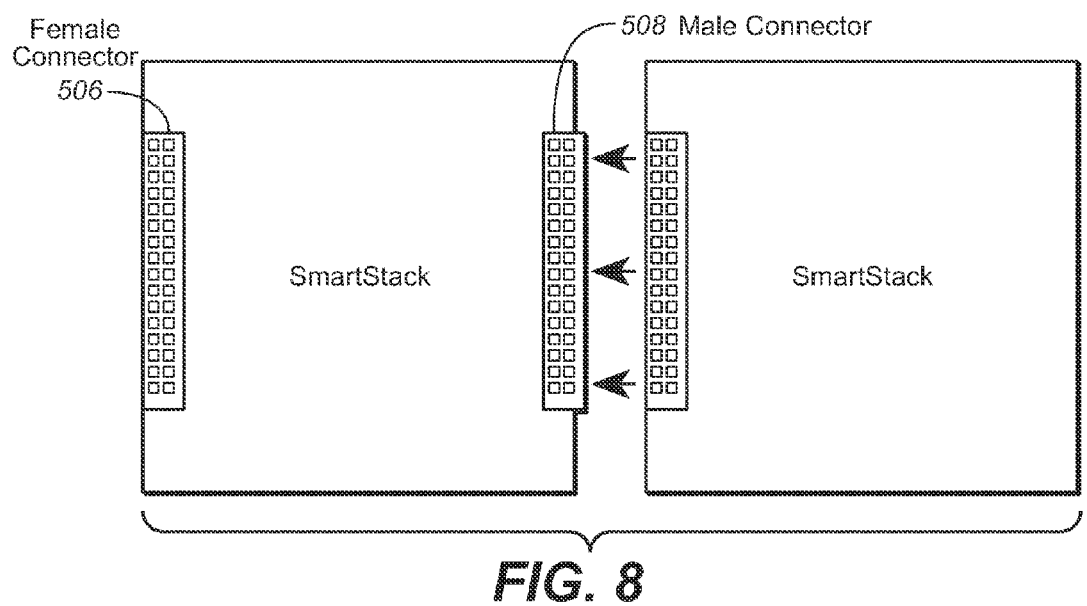
FIG. 8 illustrates daisy chaining a plurality of SmartStack modules in accordance with the present invention.

FIG. 8 illustrates daisy-chaining a plurality of SmartStack modules 500 and 502 in accordance with the present invention. Accordingly, in this embodiment, one SmartStack module 500 would include a female connector 506 on one end and a male (expansion port) connector 508 on the other to allow more cards to be plugged in. In an alternate embodiment, the expansion card can be itself devised to have several expansion ports (female connector) into which users can plug in SmartStack modules. The SmartStack module can optionally enable the user to have the capability of being able to review the pictures before committing it (saving it) to the flash media itself.

Figure 9:
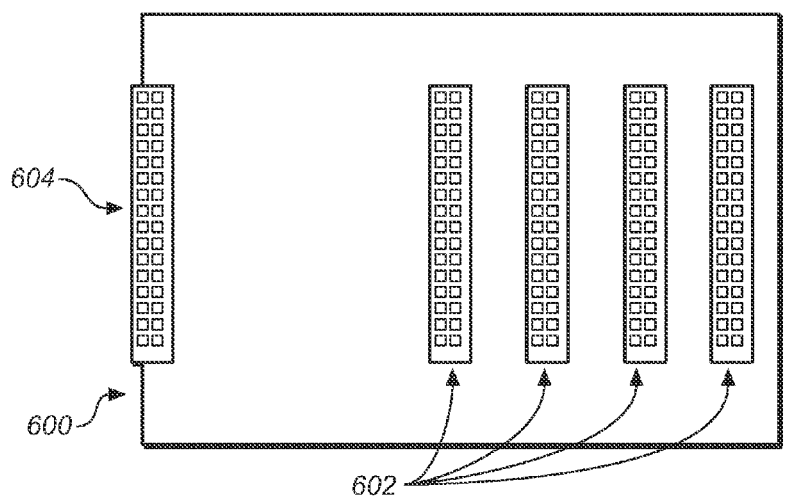
FIG. 9 illustrates a SmartStack module which is an expansion bay.

FIG. 9 illustrates a SmartStack module 600 which is an expansion bay. In this embodiment, additional SmartStack modules can be plugged into male connection slots 602 and the female connection 604 would connect to a SmartStack enabled CompactFlash Host.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A memory module, comprising:
    a memory residing at the memory module that is to be controlled by a controller on a separate device; and
    a connector to interface with the separate device, the connector comprising a pin configuration to identify to the separate device to use the controller of the separate device to control the memory of the memory module;
    wherein the memory module has no controller within the module; and
    wherein the pin configuration comprises a first card enable pin and a second card enable pin, the first and second card enable pins are to be low to indicate to the separate device that the memory module has no controller.

2. The memory module of claim 1, further comprising a second connector to interface with a second memory module having one or more memory.

3. The memory module of claim 1, wherein the connector is configured to interface with a plurality of types of devices.

4. The memory module of claim 1, wherein the memory has a security information area.

5. The memory module of claim 1, wherein the memory has a biometric information area.

6. The memory module of claim 1, wherein the memory comprises a flash memory.

7. The memory module of claim 3, wherein the connector is configured to interface with at least one of a group consisting of a Compact Flash, a Secure Digital (SD) card, a MultiMedia Card (MMC), and a Memory Stick.

8. The memory module of claim 1, further comprising a random access memory (RAM) coupled with the memory.

9. The memory module of claim 8, wherein the RAM is coupled between the connector and the memory, and the RAM comprises a cache memory.

10. The memory module of claim 1, further comprising a plurality of connectors, the plurality of connectors to interface with a plurality of memory modules.

11. The memory module of claim 1, wherein the separate device is at least one of a digital camera, a portable music player, a personal computer (PC), a flash memory reader, a personal digital assistant (PDA), or a device using removable memory.

12. The memory module of claim 8, wherein a user can review content stored in the RAM before the content is written to the memory.

13. A system comprising:
    a host device having a controller; and
    a memory module, external to the device, the module having a memory that is to be controlled by the controller on the device, and the module having a connector to interface with the host device, wherein the connector includes a pin configuration; and wherein the pin configuration comprises a first card enable pin and a second card enable pin, the first and second card enable pins are to be low to indicate to the host device to use the controller of the host device to control the memory.

14. The system of claim 13, further comprising a second connector to interface with a second memory module having one or more memory.

15. The system of claim 13, wherein the memory module has no controller within the module.

16. The system of claim 13, wherein the connector is configured to interface with a plurality of types of host devices.

17. A memory module, comprising:

at least one memory that is to be controlled by a controller on a separate host device; and means for interfacing with the host device, wherein the means for interfacing comprises a pin configuration to identify that the at least one memory is to be controlled from the host side; and wherein the pin configuration comprises a first card enable pin and a second card enable pin, the first and second card enable pins are to be low to indicate to the host device to use the controller of the host device to control the at least one memory.

* * * * *